(12) United States Patent
Mitsuse et al.

(10) Patent No.: US 7,757,262 B2
(45) Date of Patent: Jul. 13, 2010

(54) CATV SYSTEM AND AUTOMATIC NOISE CONTROLLER

(75) Inventors: Takuzo Mitsuse, 436-1-504, Ueki, Kamakura (JP) 247-0073; Hirofumi Kuwahara, Yokohama (JP)

(73) Assignees: Hwa Lin Electronic (Shenzhen) Co., Ltd., Shenzhen (CN); Takuzo Mitsuse, Kamakura (JP)

( * ) Notice: Subject to any disclaimer, the term of this patent is extended or adjusted under 35 U.S.C. 154(b) by 510 days.

(21) Appl. No.: 11/797,390

(22) Filed: May 3, 2007

(65) Prior Publication Data

US 2007/0288981 A1    Dec. 13, 2007

(51) Int. Cl.
 *H04N 7/173* (2006.01)

(52) U.S. Cl. .................................................... 725/124

(58) Field of Classification Search ...................... None
See application file for complete search history.

(56) References Cited

U.S. PATENT DOCUMENTS 5,915,205 A * 6/1999 Chen ........................... 725/125

* cited by examiner

*Primary Examiner*—Andrew Y Koenig
*Assistant Examiner*—Rong Le
(74) *Attorney, Agent, or Firm*—Muncy, Geissler, Olds & Lowe, PLLC

(57) ABSTRACT

The present invention relates to a CATV circuit with an automatic noise controller and a CATV system using the CATV circuit. The CATV circuit is used for automatically reducing upstream noises occurred in a CATV circuit for bidirectional communications between a control center and a home terminal. A variable attenuation method is applied to the CATV circuit, and a noise level measurement method is applied to measure the upstream noise level and control the attenuation rate according to the measured noise level.

9 Claims, 11 Drawing Sheets

CATV SYSTEM AND AUTOMATIC NOISE CONTROLLER

BACKGROUND OF THE INVENTION

1. Field of the Invention

The present invention relates to a CATV circuit with an automatic noise controller and a CATV system using such CATV circuit, and more particularly to a CATV circuit with an automatic noise controller and a CATV system using the CATV circuit to automatically reduce upstream noises in a CATV circuit for bidirectional communications between a control center and a home terminal.

2. Description of the Related Art

In general, the network of a CATV system is tree-structured, and noises produced by home terminals are loaded onto the network through an upstream circuit of a control center. The noises produced by the home terminals are gathered and cause interferences to normal signals, and thus a normal communication cannot be conducted occasionally. Such noise is generally called an "upstream noise". To assure a normal communication, it is necessary to suppress the source of upstream noises, which refers to a noise generating source including short waves of a frequency band of the aforementioned upstream circuit or a spurious signal produced by components of an electric appliance such as a refrigerator or a vacuum cleaner.

In the past, a control center with a broadcasting function is connected with a plurality of transceivers in a tree structure through a CATV network for executing bidirectional communications in a CATV system. A CATV circuit having a stream noise discovered at an early stage over the network is disconnected to prevent a poor communication caused by the upstream noises. In the methods of detecting a stream noise in an upstream circuit as described in the cited patents, an upstream noise transmitted from the transceiver to the control center and occurred at each transceiver can be detected, if the stream noise level exceeds a predetermined threshold.

In the aforementioned prior art, the upstream circuit will be disconnected if the stream noise exceeds a predetermined threshold, so that any adverse effect of the upstream noises on other home terminals can be eliminated by simply reducing the upstream noise level of the detected noise portion of the upstream circuit at an upstream end. However, the home terminal with a disconnected upstream circuit no longer can execute the bidirectional communications. Particularly for an apartment complex having many home terminals at the downstream of the disconnection, these home terminals will be affected significantly by the disconnected upstream circuit.

In view of the shortcomings of the prior art, the present invention provides a CATV circuit with an automatic noise controller and a CATV system using the CATV circuit, such that if a noise level exceeds a predetermined threshold, a portion of the CATV system exceeding the noise level can still hold the bidirectional communication to minimize the adverse effects brought by a disconnection of the upstream circuit.

SUMMARY OF THE INVENTION

It is a primary objective of the present invention to overcome the shortcomings of the prior art by providing an automatic noise controller installed on a CATV circuit, characterized in that the automatic noise controller of the CATV circuit of the invention can automatically reduce an upstream noise occurred at the CATV circuit for the bidirectional communications executed between a headend control center and a home terminal. A variable attenuation method is applied in series for the foregoing CATV circuit, and a noise level measurement method is used for measuring the foregoing upstream noise level, which is measured at the downstream by the variable attenuation method, and the noise level measurement method controls the attenuation control method for the attenuation rate of the foregoing variable attenuation method according to the measured noise level.

In the aforementioned structure, the upstream circuit of the CATV circuit is applied serially to the downstream using the variable attenuation method, such that after the noise level measurement method measures the upstream noise level, the attenuation control method controls the attenuation rate of the variable attenuation method according to the upstream noise level, and improves the attenuation rate of the upstream circuit to reduce the level of upstream noises without the need of disconnecting the circuit with an excessively high level of upstream noises.

The CATV circuit with an automatic noise controller and the automatic noise controller installed in the aforementioned CATV circuit are characterized in that the method for measuring the aforementioned noise level refers to a method of converting a specific frequency component of an used upstream circuit frequency band of the upstream circuit into a DC level according to the level of the specific frequency component, and a memory method of using an output level X of a signal with three different input levels Y in the foregoing specific frequency band to determine the approximation of factors a and by the approximation formula $Y = a \log_e X + b$, and a method of computing the upstream noise level Y by setting the DC level converted by the foregoing conversion method to X and then substituting X into the foregoing approximation formula.

In the aforementioned structure, a specific frequency component in an unused frequency band of an upstream circuit is converted into a DC level by the level conversion method according to an output level X of a signal outputted after inputting three different levels Y at a specific frequency, and the approximation formula $Y = a \log_e X + b$ set by the factors a and b can be used for the memory method, and the DC level converted by the conversion method is set to X, and X is substituted into the approximation formula of the memory method, so that the computing method can be used for computing the upstream noise level. The properties of the component will not be affected, and thus the upstream noise level can be measured accurately with a low-cost measurement method.

The CATV circuit with automatic noise controller and the automatic noise controller installed in the aforementioned CATV circuit are characterized in that the second noise threshold is higher than the first noise threshold in the foregoing attenuation control method. If the measured noise level is lower than the first noise threshold, the level is controlled substantially to an attenuation rate of the upstream circuit at a connected state. If the measured noise level is higher than the second noise threshold, the level is controlled to substantially to an attenuation rate of the upstream circuit at a cutoff state according to the measured noise level.

In the attenuation control method applied for the aforementioned structure, the second noise threshold is higher than the first noise threshold. If the measured noise level is lower than the first noise threshold, the level is controlled substantially to an attenuation rate of the upstream circuit at a connected state. If the measured noise level is higher than the second noise threshold, the attenuation rate of the circuit substantially in a cutoff state follows the measured noise level between the first and second noise thresholds by the attenuation rate control. If the measured noise level is lower than the first noise threshold, it is not necessary to substantially attenuate the upstream circuit for the bidirectional communications. If the measured noise level is higher than the second noise threshold, an attenuator with a high attenuation rate is inserted into the upstream circuit to shut off the upstream circuit into a cutoff state to prevent an upstream noise larger than the upstream circuit at the upstream from coming in. If the measured noise level falls between the first and second noise thresholds, it is not necessary to disconnect the upstream circuit, but the attenuation rate is controlled according to the noise level to achieve the effects of maintaining normal bidirectional communications and lowering the upstream noise.

The CATV circuit with an automatic noise controller and the automatic noise controller installed in the aforementioned CATV circuit are characterized in that the variable attenuation method is applied to the upstream and the downstream circuit of the CATV circuit for sending information to the control center, and a transmission method of sending the sender's information is attached, and the attenuation method is carried out to control the attenuation rate of the circuit substantially to a cutoff state. When the control is executed, the measured level is sent by the transmission method for the transmission control method of the control center.

In the aforementioned structure, the upstream of the variable attenuation method and the downstream circuit of the CATV circuit attaches the sender's information into the information sent to the control center by the transmission method, and the attenuation control method controls the attenuation rate for the execution of disconnecting the upstream circuit. When the control is executed, the noise level is sent to the control center by the transmission method. Since the upstream circuit is disconnected by the increase of the upstream noise, the information of the disconnected position is noticed to the control center.

The CATV circuit with automatic noise controller and the automatic noise controller installed in the aforementioned CATV circuit are characterized in that the noise level memory method for memorizing the measured noise level by a fixed time unit and the upstream of the variable attenuation method further includes a method for receiving the information sent by the control center from the upstream circuit. The transmission control method can poll the information sent from the control center and received in a fixed time interval according to the transmission method, and the noise level is memorized by the timing of the noise level information memory method and sent to the control center by the transmission method.

In the aforementioned structure, the measured noise level is memorized according to the timing of the noise level memory method by a fixed time interval for attenuating the upstream circuit at the upstream and receiving the information from the control center by the receiving method, and the receiving method receive information in a fixed time interval. Based on the polling information, the control center memorizes the noise level according to the timing of the noise level information method and sends the noise level to the control center by the transmission method, so as to have the information of the measured noise level at the automatic noise control terminal.

The CATV circuit with an automatic noise controller is characterized in that a CATV system comprises a control center having a broadcasting function, and a home terminal connected to the control center in a tree structure through a CATV circuit for executing bidirectional communications between the control center and the home terminal, and the CATV circuit of the home terminal is connected in series with the automatic noise controller and characterized in that foregoing control center has the automatic noise controller connected to the CATV circuit to substantially shut off the CATV circuit to the value of a cutoff state. If the attenuation rate of the attenuator collects the measured noise level from the transmission method. In the meantime, polling information is sent in a specific timing to the automatic noise controller connected to the CATV circuit in compliance with the transmission of the polling information, and the foregoing noise control device sends the measured noise level by the foregoing transmission method and collects a noise level by the collecting method.

In the aforementioned structure, the noise level collection method used in the control center, an automatic noise controller of the CATV circuit connected to the home terminal shuts off the CATV circuit substantially to a cutoff state for controlling the attenuation rate of the attenuator to collect the measured noise level sent by the transmission method and send the polling information to the automatic noise controller in a specific time interval. With the transmission of the polling information, the measured noise level received by the automatic noise controller by the transmission method is sent and collected. Based on the collected emergency information and the timing information of the noise level at the disconnection, the information of a cutoff state of the upstream circuit at the automatic noise controller can be learned immediately, and the measuring conditions of the history noise levels of the automatic noise controller can be obtained.

The present invention will now be described in more detail hereinafter with reference to the accompanying drawings that show various embodiments of the invention.

DETAILED DESCRIPTION OF THE PREFERRED EMBODIMENTS

Figure 1:
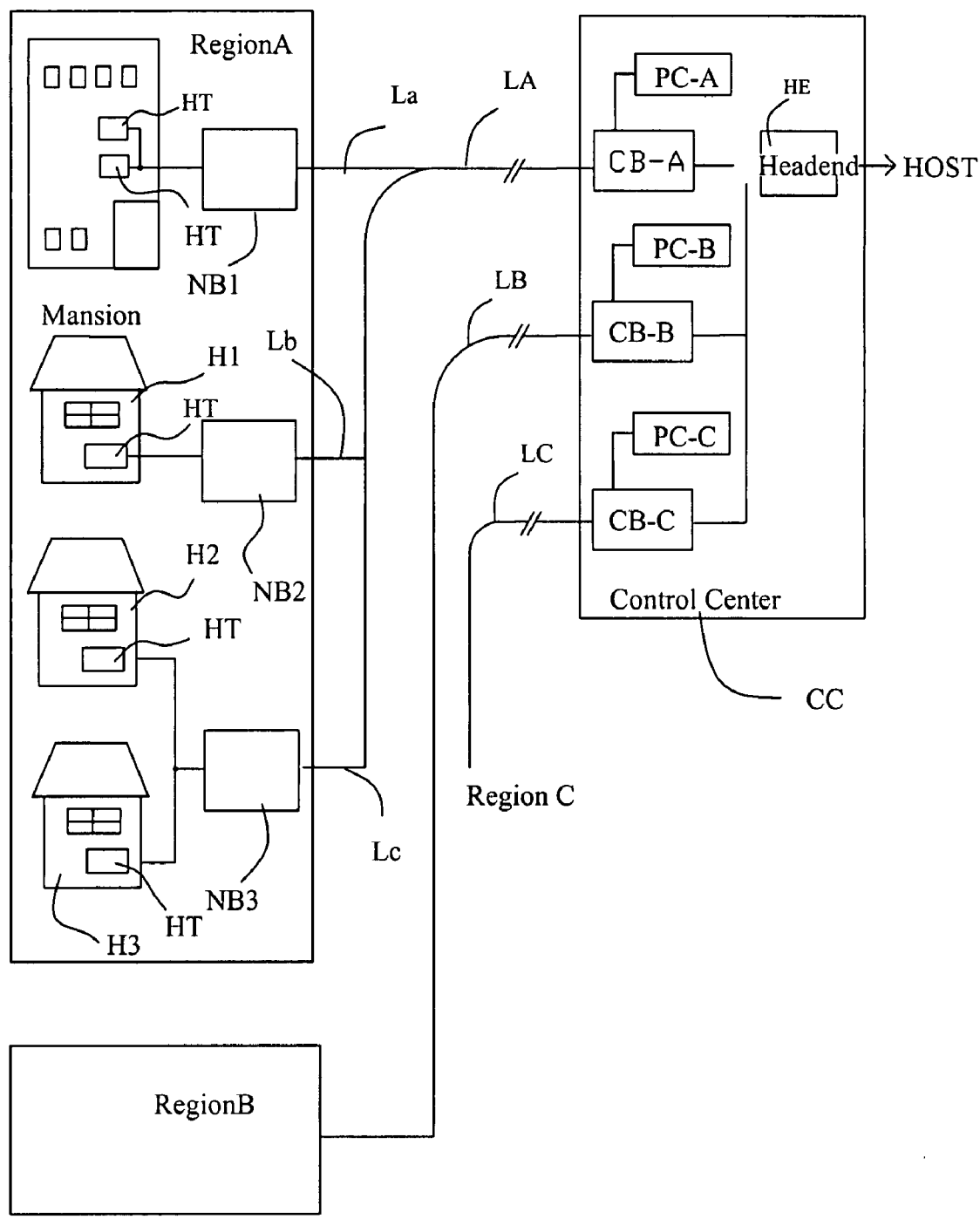
FIG. 1 is a block diagram of an overall structure with an automatic noise controller installed at a CATV system in accordance with the present invention.

It is a primary objective of the present invention provides a CATV circuit with an automatic noise controller capable of changing the attenuation rate according to an upstream noise level without disconnecting a range of the upstream circuit, and lowering the upstream noise level by increasing the attenuation rate of the upstream circuit. For the increase of upstream noise, it is not necessary to disconnect the upstream circuit immediately. Even if the noise level exceeds the threshold, the execution of bidirectional communications can be continued in certain situation exceeding the noise level, such that the adverse effect of a disconnection of the upstream circuit can be minimized.

The secondary objective of the present invention is to provide a CATV circuit with an automatic noise controller such that the upstream noise level can be measured accurately by a low-cost measurement method according to an attenuation rate set by the measured noise level without being affected by the characteristics of installed components or the need of disconnecting the upstream circuit to lower the upstream noise level.

The third objective of the present invention is to provide a CATV circuit with an automatic noise controller, such that it is not necessary to attenuate the signals of the upstream circuit substantially to continue executing the bidirectional communications waive, if the measured noise level is lower than the first noise threshold. If the measured noise level is higher than the second noise threshold, an attenuator with a high attenuation rate is inserted into the upstream circuit to shut off the upstream circuit into a cutoff state and prevent the upstream circuit from entering into a larger upstream noise. If the measured noise level falls between the first and second noise thresholds, it is not necessary to disconnect the upstream circuit, and the upstream noise level can be lowered by a control of the attenuation rate executed according to the noise level to assure normal bidirectional communications. The attenuation rate of the upstream circuit set according to the upstream noise level can be held as much as possible to maintain the communication quality.

The fourth objective of the present invention is to provide a CATV circuit with an automatic noise controller, such that the information of the disconnected location will be displayed to inform the control center if the upstream circuit is disconnected due to the increase of upstream noise, and thus the position of the disconnection of the upstream circuit in the CATV circuit, and remedial actions can be taken quickly.

The fifth objective of the present invention, the noise data measured by the automatic noise control terminal will be provided to the control center if the upstream circuit is disconnected, and remedial actions can be taken quickly and appropriately according to the timing information collected in the past.

The sixth objective of the present invention, a cutoff state of the upstream circuit of the automatic noise controller can be obtained immediately from the emergency information and the timing information of the noise level collected at the cutoff state. In the meantime, the measuring condition of history noise levels of the automatic noise controller can be obtained. With the information obtained from the control center, the same effect of the fourth and sixth objectives of the present invention can be achieved.

Figure 2:
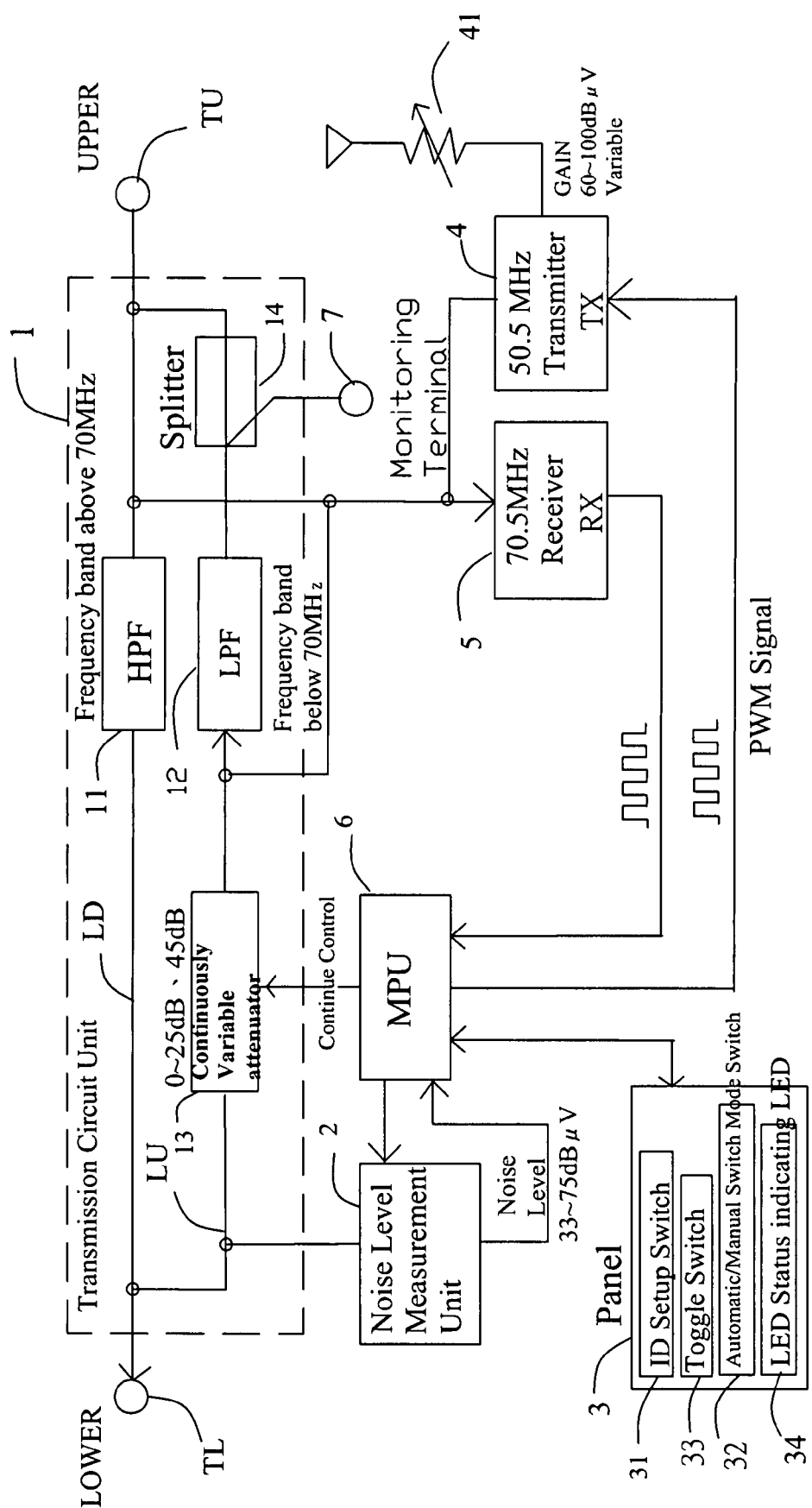
FIG. 2 is a block diagram of an output of an automatic noise controller in accordance with a preferred embodiment of the present invention.
Figure 3:
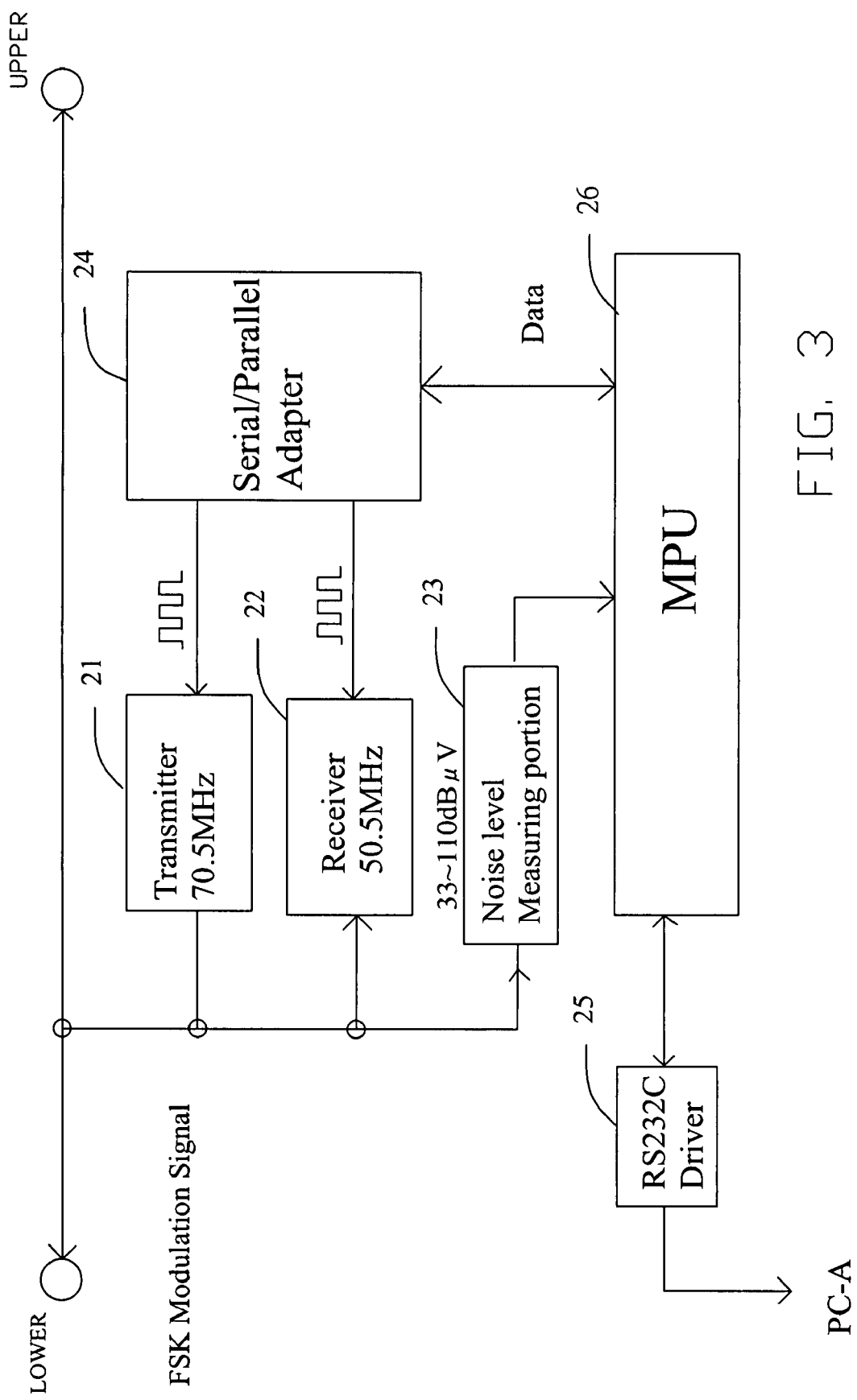
FIG. 3 is block diagram of the configuration of a CPU in accordance with the present invention.

Referring to the following figures for a CATV circuit with an automatic noise controller in accordance with a preferred embodiment of the present invention, FIG. 1 shows a schematic structural diagram of a CATV system comprised of a CATV circuit with an automatic noise controller in accordance with the present invention, FIG. 2 shows a block diagram of a noise control terminal installing a CATV circuit with an automatic noise controller in accordance with the present invention, and FIG. 3 shows a block diagram of a CPU of a control center of the CATV system in accordance with the present invention.

In FIG. 1, a headend HE in a control center CC are divided into regions A, B, C by main coaxial cables LA, LB, LC of the CATV circuit (hereinafter referred to as CATV circuits) and the regions A, B, C are connected through CPUs CB-A, CB-B and CB-C respectively. For instance, coaxial cables La, Lb and Lc (hereinafter referred to as CATV circuits) are CATV circuits of the branch cables of the main coaxial cable LA. For example, CATV circuit La is connected to a home terminal HT of an apartment in the apartment complex through a noise control terminal NB1 inserted in the circuit, and the CATV circuit Lb is connected to a home terminal HT at a home H1 through a noise control terminal NB2 inserted in the circuit, and the CATV circuit Lc is connected to a home terminal HT connected to two separate homes H2, H3 through a noise control terminal NB3 inserted in the circuit. In the meantime, the noise control terminal of an apartment complex can be installed at each floor of the apartment complex. In this structure, the headend HE and the CATV circuits La, La, Lb, Lc of one or a plurality of home terminal HT in the regions are inserted into the CPU CB-A of the regions and the noise control terminals NB1, NB2, NB3 in series.

As described above, the noise control terminals NB1, NB2, NB3 are installed in front of the home terminal HT, and one of the noise control terminals NB1, NB2, NB3 is installed at the entrance the apartment complex (or each floor), or at the entrance of a house, or a nearby gathering location of many gathering locations. The CPU CB-A, CB-B, CB-C are installed within the framework of the control center CC, and generally each region has one set of CPU, and the number of CPU is small. In addition, each CPU CB-A, CB-B, CB-C can be connected to at most $16_4$=65536 noise control terminals, and a RS232C serial communication cable is connected to a dedicated computer for each set of PC-A, PC-B and PC-C.

The FIG. 1, the control center CC includes a broadcast device (not shown in the figure) for sending out the CATV broadcast signal through a home terminal HT, an Internet device (not shown in the figure) for accessing Internet, and transceiver (not shown in the figure) installed between the home terminals HT through the CATV circuit for executing bidirectional communications, and connected to a host computer HOST at a headend HE.

The CATV circuit installs a downstream circuit and an upstream circuit installed at the CPU CB and each noise control terminal (which is represented by NB unless stated otherwise) in the region for providing bidirectional communications. The downstream circuit and upstream circuit of the CATV circuit are used for carrying out bidirectional communications by a FSK method. The specific operation method of the CPU CB-A and the dedicated computer PC-A are illustrated in the figure, and the region A has at most 65536 sets of noise control terminals, and a polling is carried out in a specific time interval, and each noise control terminal NB temporarily memorize the actual data of a measured noise level by a fixed timing, and, the actual data is sent from each noise control terminal NB and collected in 24 hours, and then the collected data is stored into a hard disk of the computer PC-A by the memory method.

Referring to FIG. 2 for the illustration of a specific structure of a noise control terminal NB, the noise control terminal NB installs a transmission circuit unit 1, a noise level measurement unit 2, a panel unit 3, a transmitter 4, a receiver 5 and a microcomputer (MPU) 6 controlled by a program.

The aforementioned transmission circuit unit 1 includes an upper connection terminal TU and a lower connection terminal TL, a downstream circuit LD and an upstream circuit LU are formed between the upper connection terminal TU and the lower connection terminal TL. The upper connection terminal TU is disposed at a cutoff end of a disconnected CATV circuit and belongs to an upper noise control terminal. On the other hand, a lower connection terminal TL disposed at a cutoff end of CATV circuit at a control center CC belongs to a lower noise control terminal. Both upper and lower connection terminal TU, TL are connected to a cutoff end of a CATV circuit of a home terminal HT. In this structure, the noise control terminals are connected in series in the CATV circuit. More specifically, each connecting terminal is formed at a coaxial cable of the CATV circuit, and each connector of the coaxial cable installed at each cutoff end can be connected or not connected selectively.

The aforementioned transmission circuit 1 further includes a high pass filter (HPF) 11 connected to a downstream circuit LD at the upper terminal TU and the lower terminal TL for passing a frequency band over 70 MHz, a low pass filter (LPF)12 for passing a frequency band below 70 MHz, and a continuously variable attenuator 13, both connected to an upstream circuit LU of the upper terminal TU and the lower terminal TL. The continuously variable attenuator 13 is a voltage control type variable attenuator composed of a pin diode, and the attenuation varies continuously with the signal control of the MPU6. If the attenuation rate of the variable attenuator 13 exceeds 45 dB, then the upstream circuit LU will be disconnected from a disconnector. If the attenuation rate of the variable attenuator 13 remains below 3 dB, the upstream circuit LU will be connected to a connector. Such arrangement can set an arbitrary value in the range of 4~25 dB for the attenuator, for switching the attenuation rate.

The input of the aforementioned noise level measuring portion 2 is connected to the upstream circuit LU at an input end of the continuously variable attenuator 13, and the signal level of a specific frequency in the frequency band can be detected by an analog peak value hold method, and the detected absolute value dBuV is outputted. By then, the specific frequency band is an unused bidirectional communication frequency band selected from the frequency bands of the upstream circuit LU of the CATV system. For instance, a frequency band component has a central frequency of 30.5 MHz±1 MHz is inputted from an upstream circuit LU through a SAW filter comprised of a band pass filter (BPF), and then a noise level with a specific frequency band (30.5 MHz±1 MHz) at 33 dBuV~75 dBuV is measured according to the inputted component, and the measured result is digitized by a built-in A/D converter of the MPU6 and stored in the MPU6.

The aforementioned panel 3 is provided to set an ID code for distinguishing a noise control terminal from others, and the ID code can be set as 0000-FFFF. Therefore, at most 65536 ID codes can be set by an ID setup switch 31 comprised of quarternary to hexadecimal digital rotary switch, and an automatic/manual toggle switch 32 for slidably toggling the automatic/manual operation. If the automatic/manual toggle switch 32 is toggled manually, the continuously variable attenuator 13 can be used for setting a mode switch 33 to a function mode as a disconnector, a connector, and an attenuator. If the automatic mode is adopted, the continuously variable attenuator can be used for controlling the attenuation rate for the disconnector, connector and attenuator according to the measured noise level automatically. If the manual mode is adopted, the mode switch 33 sets the attenuation rate of the attenuator according to the measured noise level. In the meantime, the panel 3 installs a light ON/OFF assembly such as nine LEDs 34 connected to the MPU and disposed on the panel 3 for displaying various different states of the noise control terminal. The ID setup switch 31 is provided for setting the ID code, and the automatic/manual toggle switch 32 and the automatic/manual mode switch 33 are provided for setting the mode which will be read into the MPU6, and the MPU6 controls the ON/OFF of the LED 34.

After the output and input of the transmitter 4 and receiver 5 of the noise control terminal are connected with each other, the input of HPF11 of the downstream circuit LD is connected to each input of the upstream circuit LU. In the meantime, the input and output are connected to the transmitter 4 on the MPU6 for sending data according to the MPU6, and the 0.5 MHz frequency band 7 of the CATV circuit and the receiver of the control center CC are used for sending the FSK modulation signal at a level of 60 dB~100 dB. In addition, the receiver 5 is provided for receiving a single frequency 50.5 MHz, digital FSK modulation signal of a minimum 45 dB transmitted from the transmitter of the control center CC and the modulated data is inputted to MPU6. With the transmitter 4 and receiver 5 of the MPU6, the bidirectional communications with the control center CC can be accomplished. The output level of the transmitter 4 is set to a recommended value by the gain adjusting device 41 when each terminal is installed. During transmission and testing, the maximum output can be up to 100 dB according to the command of the central controller CB of the control center CC. The transmission and receiving frequency varies with the CATV system of different operators and manufacturers. The values adopted in the foregoing description are frequencies of standard specification.

Besides the read only memory (ROM) for storing a program, the region for storing data, and the random access memory (RAM) having the operating regions for processing each item, the MPU6 has built-in programs stored in the ROM for the processing of different CPUs, and the detailed description will be given below. Based on the program, the noise level is measured for controlling the attenuation rate of the continuously variable attenuator to control, output and process the PWM (pulse width modulation) control signal, and conduct bidirectional communications between the central controller CB of the control center CC and the noise control terminal NB. As to the noise measurement, a specific correction method is used for measuring the noise level.

The monitoring terminal 7 is installed at the upstream circuit of a splitter 14 between the upper connection terminal TU of the transmission circuit portion 1 and the LFPF12.

The noise control terminal NB (not shown in the figure) is accommodated in a motherboard with an area approximately equal to 170 mm×82 mm, and the daughter board builds in components, and the small seal box accommodates a transmission circuit portion 1, a transmitter 4 and a receiver 5, and the daughter board has a noise level measuring portion 2 accommodated in a small sealed box for installing electronic component. The motherboard installs a panel 3 with an ID setup switch 31, an automatic/manual toggle switch 32, a mode switch 33, an LED 34, a MPU6, and an AC100V DC power supply. All these are accommodated in a 178 mm×82 mm×40 mm metal box. The metal box installs a panel 3, an AC socket, an upstream circuit monitoring terminal 7, and a female connector used for the upper connection terminal TU and lower connection terminal TL.

Referring to FIG. 3 for the specific structure of a central controller CB-A in the control center CC, the central controller CB-A comprises a noise control terminal in region A for carrying out communications, a data collected from the noise control terminal, and a dedicated computer PC-A for sending out the data as shown in the figure, and the central controller CB-A comprises a CATV circuit at a headend HE of an upper end, and each noise control terminal is installed at a lower end, a transmitter 21, a receiver 22, a noise level measuring portion 23, a serial/parallel adapter 24, a RS232C driver 25 and a MPU 26.

After the output of the transmitter 21 is connected to the input of the receiver 22 and the input of the level measuring portion 23, the CATV circuit is connected. The input of the transmitter 21 and the output of the receiver 22 are connected to the I/O port of the MPU 26 through the serial/parallel adapter 24, and the output of the noise level measuring portion 23 is connected to the input port of the MPU 26.

The transmitter 21 can input the data to an I/O port of the MPU 26 of the receiver of each noise control terminal receiver through the serial/parallel adapter, and the 70.5 MHz digital FSK modulation signal is sent from the CATV circuit to the receiver 22, and the transmitter of the noise control terminal adopts a 50.5 MHz digital FSK modulation method for the transmission and uses the serial/parallel adapter 24, the I/O port of the input MPU 26. The MPU 26 of the receiver 22 receives data from each noise control terminal, and sends the data to the dedicated computer PC-A through the RS232C driver 25 and stores the data into the computer PC-A by the memory method, so that the data from the dedicated computer PC-A is inputted through the RS232C driver.

After the data from the transmitter 21 is outputted by the aforementioned level measuring portion 23, and the intensity of the input signal of the receiver 22 is measured by dBuV, the intensity of the measured communication signal is used for checking whether or not the communication of the MPU36 is connected if the measured signal level is inputted to MPU 26.

The central controller CB not shown in the figure is installed at a motherboard with an area of approximately 250 mm×120 mm, and the daughter board is provided for installing components, and the small sealed box accommodates a transmitter 21, a receiver 22, electronic components installed on the daughter board and a noise level measuring portion 23 accommodated in the small sealed box. In addition to the MPU 26, the motherboard also installs a DC power supply with an input of AC100V. All these components are accommodated in a metal box. The metal box is equipped with an AC socket, a RS232C connector, and a female connector for connecting upper and lower CATV circuits.

Figure 4:
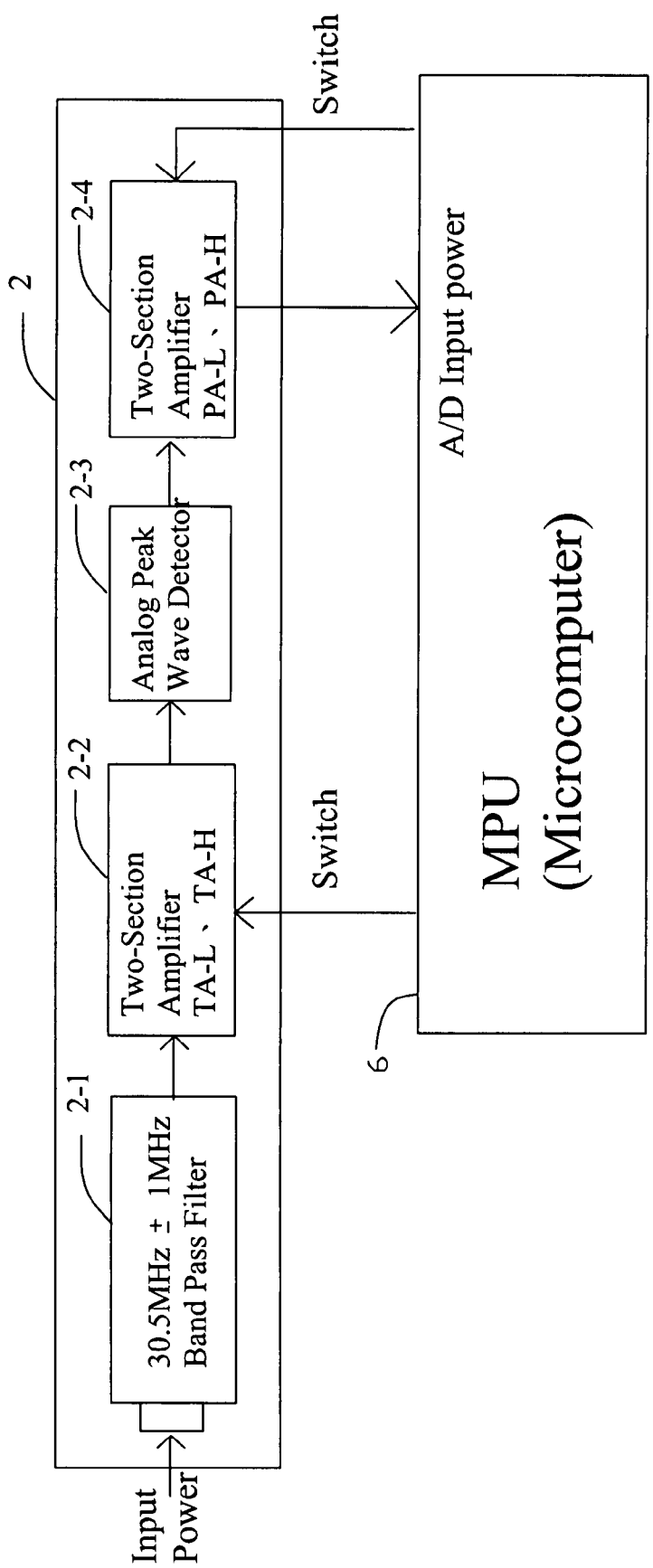
FIG. 4 is a block diagram of a specific noise level measuring position as shown in FIG. 2.

For the noise level measuring portion 2 of the aforementioned noise control terminal, it is not necessary to measure a plurality of frequencies, but simply needs to measure a single frequency, because the measurement has a range of 33-75 dBuV to achieve the effect of simplifying the structure. More specifically, the noise level measuring portion 2 has a middle frequency of 30.5 MHz passing through a frequency band component with ±1 MHz bandwidth as shown in FIG. 4. If a band pass filter (BPF)2-1 composed of a SAW filter is used to output the BPF2-1, the MPU6 will be controlled to switch possible amplification rates for the foregoing two-section amplifier 2-2. By the two-section amplifier 2-2, the gained analog noise is used for switching two section of the analog peak wave detector 2-3 for the peak wave detection. With the voltage of the noise level of the wave detection of the analog peak wave detector 2-3 is controlled by the MPU6 to switch 2 section of the amplification rate, and output the gain of later section of the two-section amplifier 2-4 of the BPF2-1. The output at a later section of the two-section amplifier 2-4 is inputted to the MPU6 and digitized at an input port of the built-in 8-bit A/D converter and then stored into the MPU6. Further, the amplification rate of the two-section amplifiers 2-2, 2-4 is controlled by the MPU6. To adjust the level of the 8-bit A/D adapter in the MPU6, the low amplification rate TA-L and high amplification rate TA-H at the front section of the two-section amplifier 2-2, the low amplification rate PA-L and high amplification rate PA-H at the later section of the two-section amplifier 2-4 must be in compliance with the A/D conversion value of the MPU6, so that overall amplification rate can be increased for switching the combinations of TA-L and PA-L, TA-L and PA-H, TA-H and PA-L, and TA-H and PA-H sequentially to adjust the input of the A/D adapter. In the most appropriate DC level, the ROM of the MPU6 has stored a single frequency corrected data, and the measured value data can be converted into the absolute value dBuV for the output.

The corrected data stored in the ROM of the MPU6 is provided for eliminating the band pass filter (BPF)2-1, and the individual characteristics include the front section of the two-section amplifier 2-2, the analog peak wave detector 2-3, and the rear section of the two-section amplifier 2-4 (including the level, frequency, and attenuator characteristics, and parameters of each component) installed according to the following method: The middle frequency measured at the middle of the frequency band is 30.5 MHz. For example, the signal with an intensity of 30 dBuV, 45 dBuV, 55 dBuV, 70 dBuV is inputted from an analog signal generator to the noise level measuring portion 2, the measured output value is used for the A/D conversion, The MPU6 collects the data. In general, the gain characteristic varies with the natural logarithm $\log_e X$, and the measured data X with a frequency of four different frequencies is inputted to the true value Y, and Y=a $\log_e X$+b, for calculating the values a, b. After the values a, b are calculated from the measured frequency, these values are used as corrected data and stored in the MPU6. Based on these data the corresponding digital input value X, true value YdBuV as Y=a $\log_e X$+b can be used for the calculation. The aforementioned corrected data can be calculated, and then low-cost components can be used to construct a high performance level measuring device. The invention can eliminate all errors of a standalone component, and a level measuring device of a standalone system. The noise level measuring portion 2 comprised of this level measuring device can build the low-cost components into the automatic noise control terminal.

In the aforementioned structure, the noise level measuring portion 2 uses the signal intensity of a single frequency (such as 30.5 MHz) at a range of 33-75 dBuV for the measurement. Based on the measured noise level, the MPU6 can execute the following control. If the measured value is lower than 40 dBuV, then it is determined as a low noise level, and the attenuation rate of the continuously variable attenuator 13 is the minimum. If the upstream circuit is set substantially to a connected state, the measured value will be greater than 70 dBuV, and it is determined as a high noise level, and the attenuation rate will be greater than 45 Db, and the upstream circuit is shut off substantially to a cutoff state. If the measured value falls within a range of 40-70 dBuV, the attenuation rate of the continuously variable attenuator 13 is set between 4 dB-25 dB based on the ratio of measured noise levels, and such control is conducted automatically by the MPU6.

Figure 5:
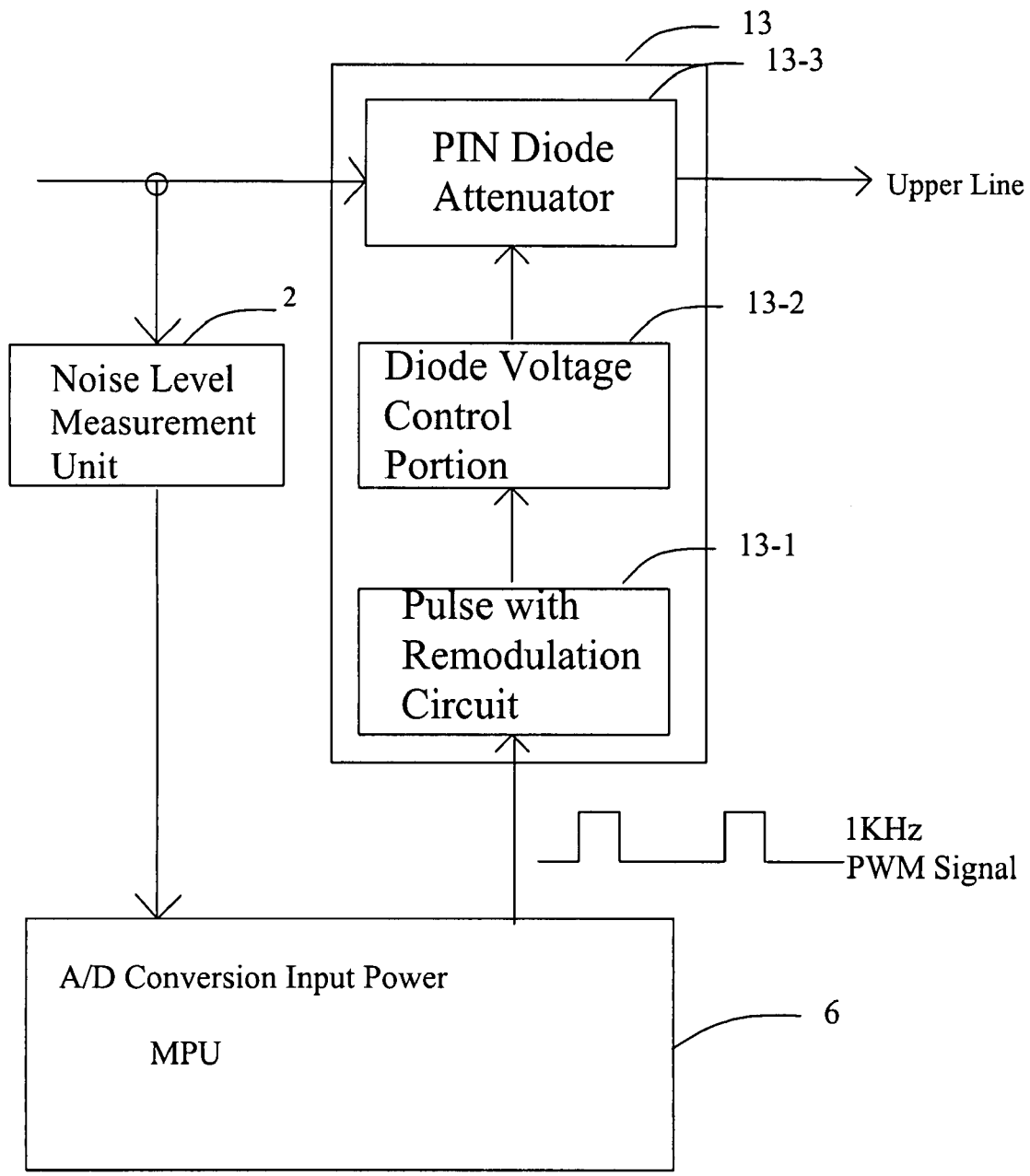
FIG. 5 is a block diagram of a specific continuously variable attenuator as shown in FIG. 2.

In the aforementioned transmission circuit portion 1, the continuously variable attenuator 13 is illustrated specifically in FIG. 5. The pulse width of the digitized and measured noise levels is outputted by the MPU6, and a variable PWM signal is modulated to a PWM circuit 13-1 with a DC voltage according to PWM circuit 13-1 to modulate the produced noise level, and the diode voltage control portion 13-2 with a large voltage is outputted. The voltage outputted from the diode voltage control portion 13-2 is controlled such that the attenuation rate achieves its minimum −45 dB, and the PIN diode attenuator 13-3 is provided for controlling the continuous sectionless change. Based on the measured noise level of the noise level measuring portion 2, the attenuation rate of the control continuously variable attenuator 13 can be controlled as described in details below.

Figure 6:
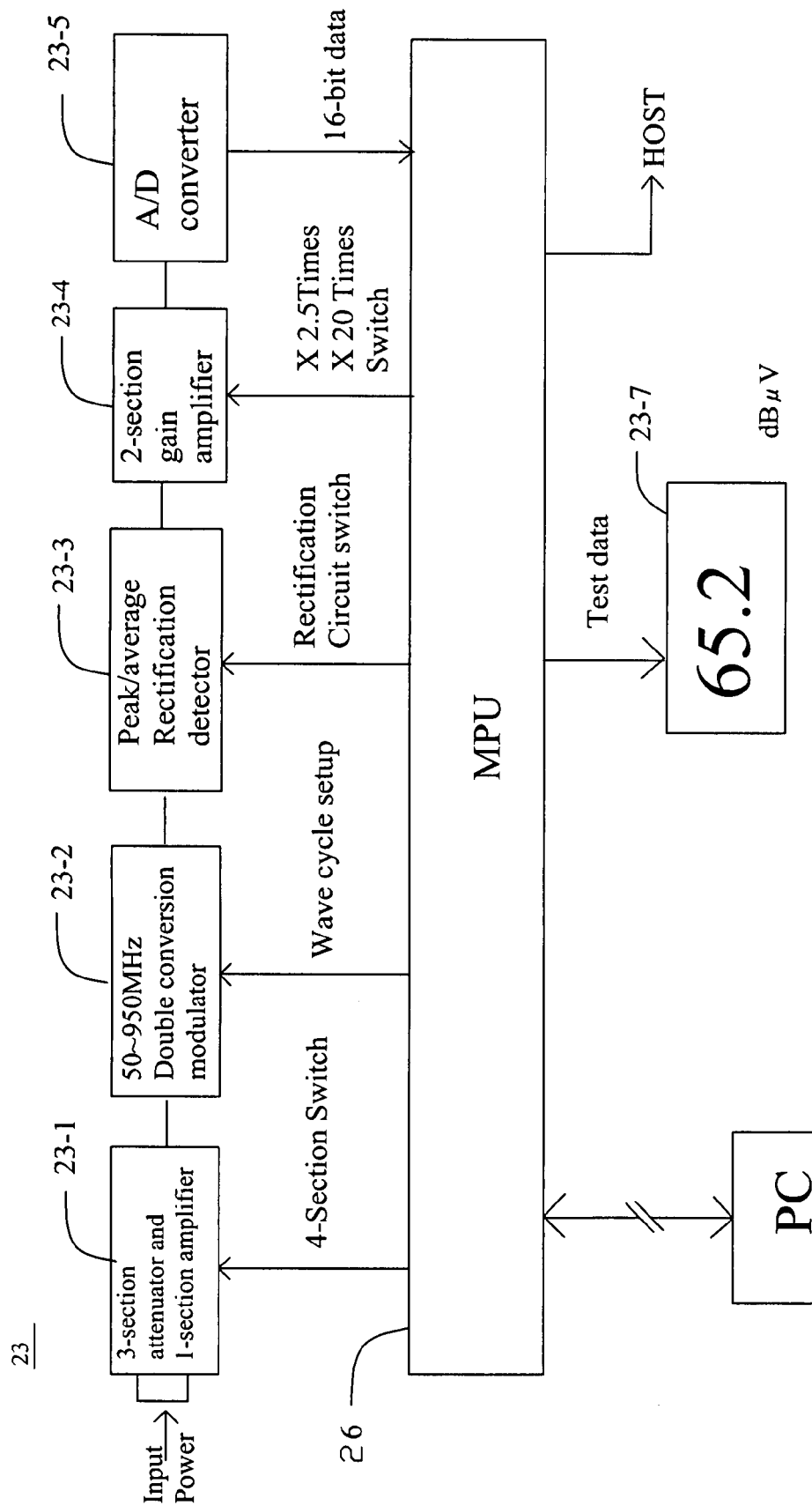
FIG. 6 is a block diagram of a specific level measuring position as depicted in FIG. 3.

In addition, the level measuring portion 23 in the central controller CB is illustrated in FIG. 6. After the measured signal is inputted, an automatic switch is preformed according to the intensity of the input signal intensity, and the CPU 26 controls the attenuation rate, such that a 30 dBuV weak signal to a 110 dBuV strong signal can measure the 3-section attenuator and 1-section amplifier 23-1 including the measured frequency, from the 30-950 MHz double conversion modulator 23-2 of the PLL synthesizer set by the MPU 2, and input the frequency signal selected by the modulator 23-2 and passed through the narrowband SAW filter of a middle frequency and a amplifier, and the peak rectification or average rectification can be converted into peak/average rectification detection portion 23-3 of DC analog level signal, and the output signal at the rectification detection portion 23-3 is gained by two different types of amplification rates and adjusted to the two-section amplifier 23-4 for the signal intensity suitable for the following A/D conversion. Through the gain of the two-section amplifier 23-4, the signal level is converted by A/D adapter 23-5 to 16-bit digital data, and the digital data of the signal level converted by the A/D adapter 23-5 is displayed and stored into the MPU 26. The MPU 26 has the standalone characteristic of a corresponding 3-section attenuator and 1-section amplifier 23-1, a 30-950 MHz double conversion modulator 23-2, a peak/average rectification detection portion 23-3, two-section amplifier 23-4. With the correction table, the inputted 16-bit digital value bases on the magnitude and frequency characteristics to calculate the intensity of the input signal by a built-in natural logarithm formula, and the absolute value dBuV is measured. The measured result is displayed by a 3-digit digital display device 23-7 or the data is sent to the host computer HOST.

The level measuring portion 23 inputs the measured signal to the 3-section attenuator and 1-section amplifier 23-1. The 3-section attenuator and 1-section amplifier 23-1 controls the attenuation rate and amplification rate switched by the MPU 26 according to signal intensity automatically, for measuring a range of signals from a weak signal of 30 dBuV to a strong signal of 110 dBuV. The measured frequency of 30-950 MHz double conversion modulator 23-2 is set by the MPU 26 at the PLL synthesizer. The selected frequency signal is sent to peak/average rectification detector 23-3 through a middle-frequency narrowband SAW filter and amplifier, for converting the DC analog level signal by a peak rectification or an average rectification. The output signal of the peak/average rectification detection portion 23-3 is adjusted by the 2-section gain amplifier 23-4 to the signal intensity applicable for the A/D conversion. In the A/D adapter 23-5, the signal is converted into a 16-bit digital signal. The digital signal will be read into MPU 26. The MPU 26 will prestore a corrected table, and the inputted 16-bit digital value can be computed by a natural logarithm formula according to the magnitude and frequency, and the intensity of the input signal can be measured by the absolute value dBuV. The measured result is displayed by a 3-digit digital display device 23-7 or used as a data sent by the host computer HOST.

The level measuring portion 23 is measured at a frequency range of 50-950 MHz, and signals of four different intensities can be set for every 50 MHz in the correction table. The correction table is produced according to the signals of four different intensities of the frequency of the digital and analog signal generators, such as the dBuV, 45 dBuV, 55 dBuV and 70 dBuV signal input level measuring portion 23. In the AD conversion, the A/D adapter 23-5 measures the output value and the MPU 26 collects the data. A true value Y is obtained from the measured data X collected from the four different intensities, and $Y=a \log_e X+b$ is used for the computation after the values a and b are obtained for measuring the frequency, such that after the frequency values a, b are measured, the measured values can be used as a correction data and stored into the MPU 6. According to this table, the digital input value X and the true value YdBuV can be computed by $Y=a \log_e X+b$. This correction table can be used as the table, so that low-cost components are used for constructing a high performance level measuring device to produce a level measuring device for eliminating all errors for standalone components and standalone systems.

Figure 7A:
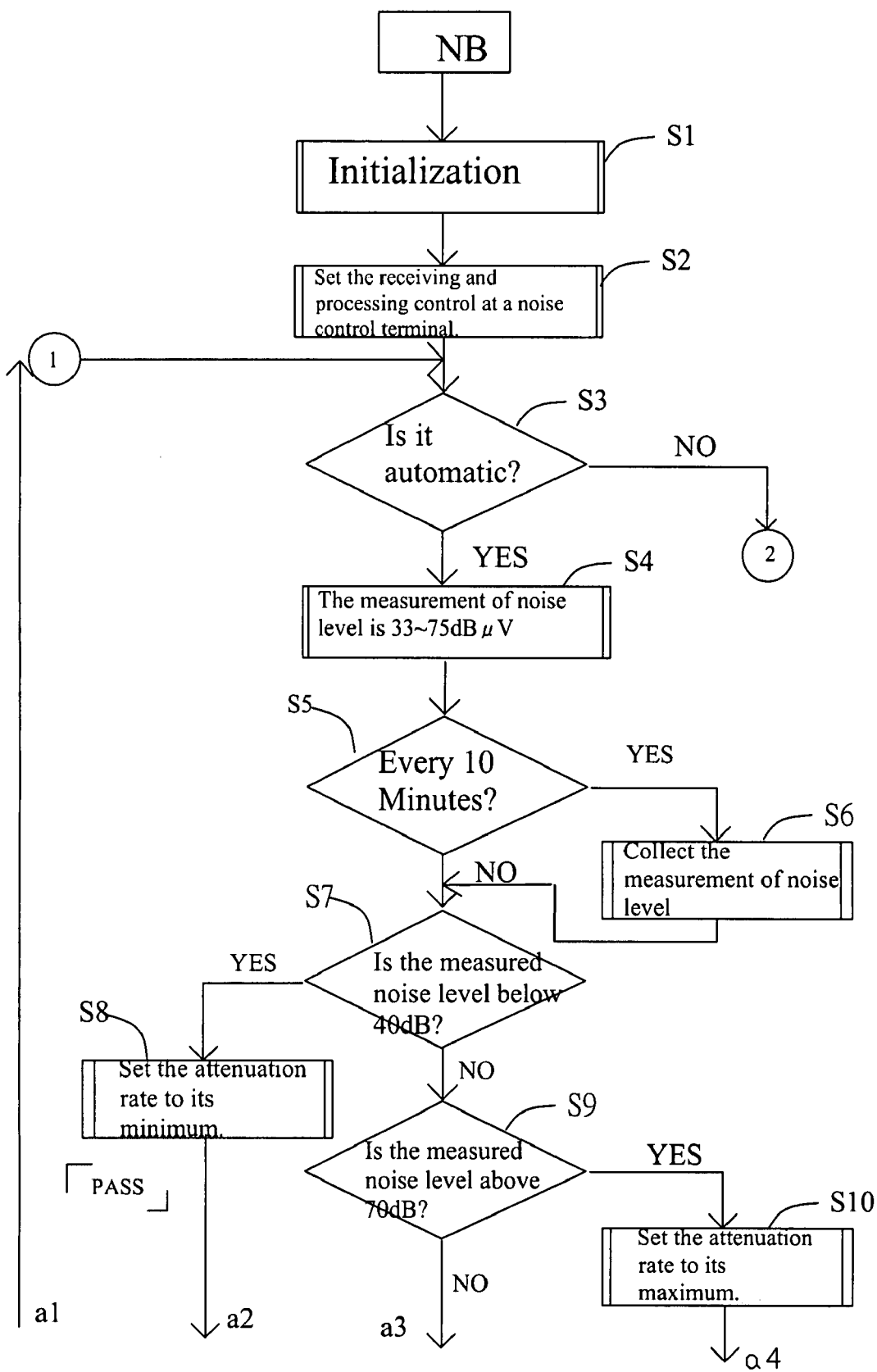
FIGS. 7A and 7B show a complete flow chart of a MPU according to the portion processed by a preinstalled program as shown in FIG. 2.
Figure 7B:
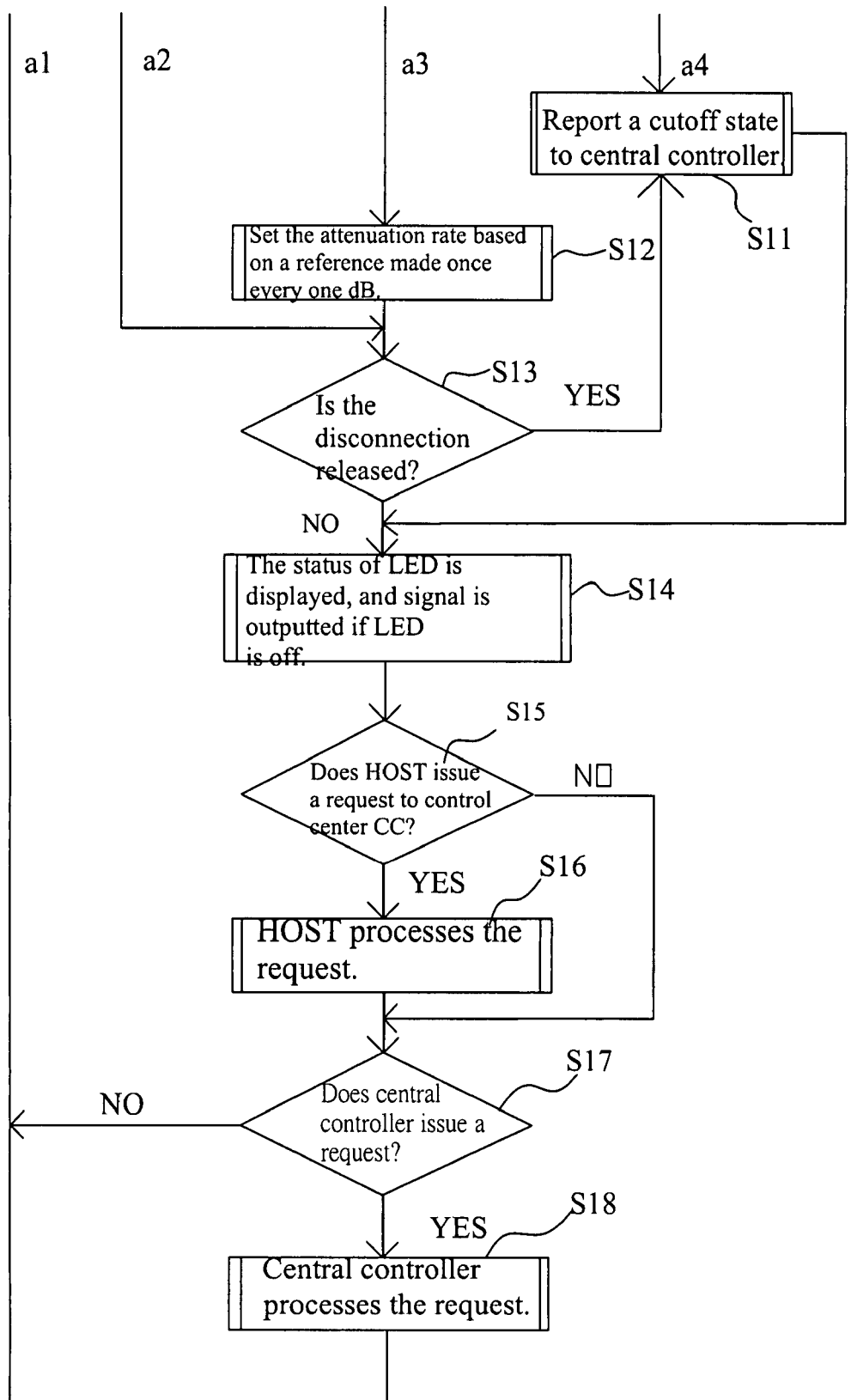
Figure 8:
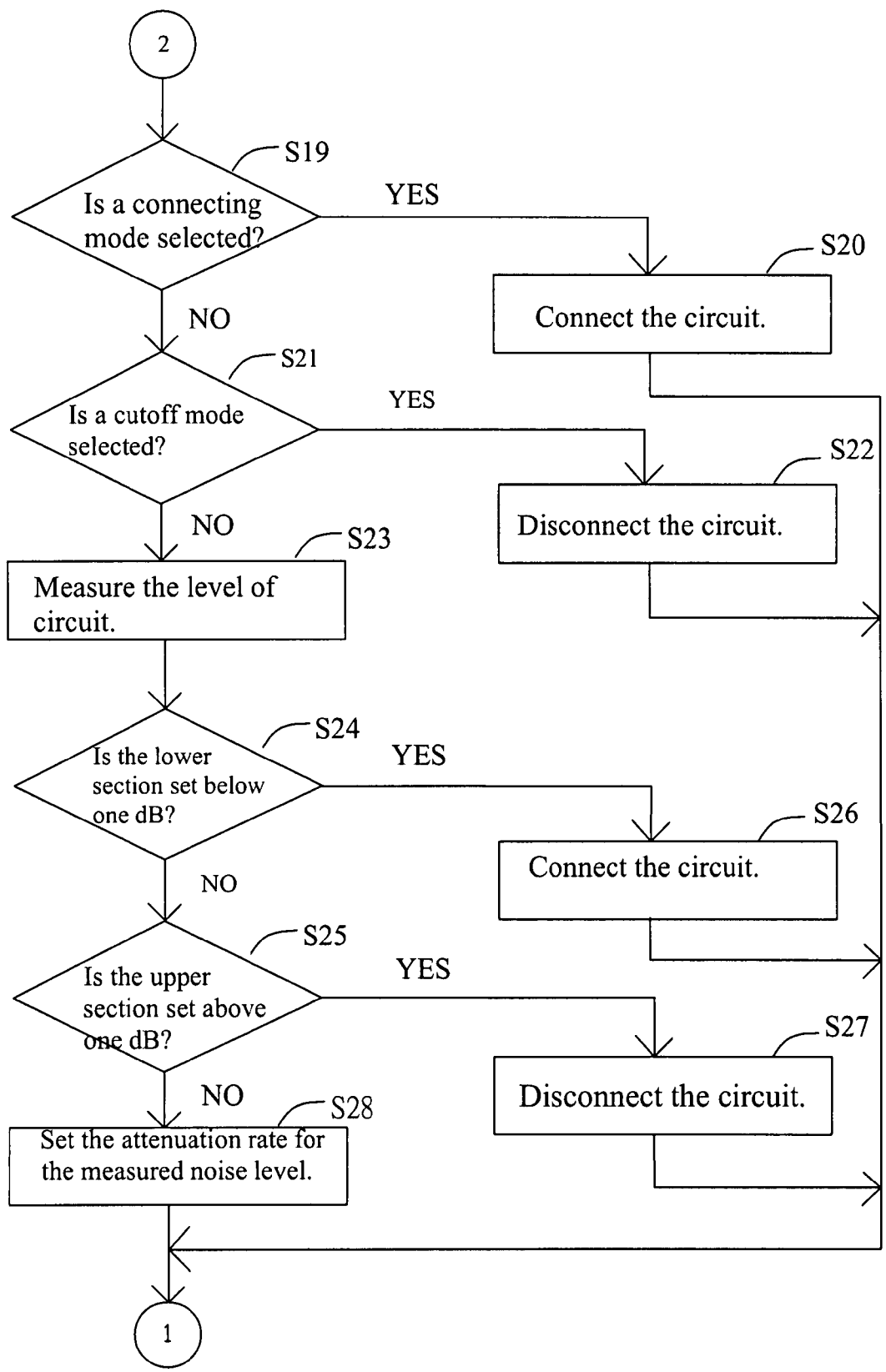
FIG. 8 is a flow chart of a MPU according to a portion other than the portion processed by a preinstalled program as shown in FIG. 2.

Referring to FIGS. 7A, 7B and 8 for the flow charts of the process of the noise control terminal 2 and the execution of the program of the MPU 6.

The MPU 6 of the noise control terminal 2 starts operating and executes the initialization after it is powered on (Step S1). The dedicated computer PC-A of the control center CC sets the parameters required for the control, and use a transmitter 21 to transmit the control parameters required for the receiving and processing (Step S2). If the automatic/manual toggle switch 32 of panel 3 is switched to an automatic mode (YES for Step S3), the measurement of the noise level is 33 dBuV~75 dBuV (Step S4). The measured noise level is taken once for every 10 minutes (YES for Step S5). The data region of the RAM in the MPU 6 memorizes 2 hours of noise level data connected as a timing noise data (Step S6). If the measured noise level is less than 40 dB (YES for Step S7), the attenuation rate of the variable attenuator 13 is set to the minimum for passing a signal in a connected state (Step S8). If the measured noise level is not less than 40 dB (NO for Step S7) and determined to be greater than 70 dB (Step S9) (YES for Step S9), then the attenuation rate of the variable attenuator 13 is set to the maximum for shutting off the signal substantially to a cutoff state (Step S10). The cutoff state of the CATV circuit is reported to the central controller CB-A of the control center CC (Step S12). In addition, if the measured noise level is less than 70 dB (NO for Step S9), reference is made for every 1 dB in a prepared attenuation table to compute a value 13 for setting the attenuation rate (Step S12). With the setting of this attenuation rate, if the cutoff state of the CATV circuit is released (YES for Step S13, the cutoff state of the CATV circuit is released and reported to a central controller CB-A of the control center CC (Step S12). The LED will be lit for a status of displaying the LED 34 or an occurrence of an error, and if the LED is off, the signal will be outputted (Step S14). If the host computer HOST issues a request to the control center CC (YES for Step S15), the request will be processed (Step S16). If the central controller CB-A issues a request (YES for Step S17), the request will be processed (Step S18). In this request, a polling request comes from the central controller CB-A 的 polling, and thus the maximum data which are stored for not more than 2 hours in the memory of the MPU 6 will be sent to the central controller CB.

If the automatic/manual toggle switch 32 of the panel 3 is not automatic (NO for Step S3), users only need to select the connecting mode from the mode switch 33 (YES for Step S19), so that the attenuation rate of the variable attenuator 13 will be set to a minimum to define a signal that goes through a circuit connection at a connected state (Step S20). If the mode switch 33 is switched to a cutoff mode (YES for Step S21), the attenuation rate of the variable attenuator 13 will be set to a maximum to substantially shut off the signal into a cutoff state and disconnect the circuit (Step S22). If the mode switch 33 is set to a mode selected from a connected mode or a cutoff mode (NO for both Steps S19 and S21), the level of the circuit will be measured (Step S23) according to the measured value (Step S24 and S25), and each circuit carries out the connection (Step S26), the cutoff (Step S27), and the setup of the attenuation rate for the measured noise level (Step S28).

In the description above, the microcomputer (MPU) 6 adopts an attenuation control method 6-1 for controlling the attenuation rate of the variable attenuator 13 according to the measured noise level If the output level X is set according to the Y signal the three different levels of the input specific frequency, a memory method 6-2 with an approximation formula $Y=a \log_e X+b$ for the set factors a and b can set the converted DC level to X, and X is substituted into the memorized approximation formula. With the computing method 6-3 for computing the upstream noise level Y, the upstream circuit LU is controlled substantially to the attenuation rate at a cutoff state, and the noise level is sent from the transmitter 4 to the transmission control method 6-4 of the control center CC, and the measured noise level is memorized by the timing at a specific time according to the noise level memory method 6-5.

Figure 9A:
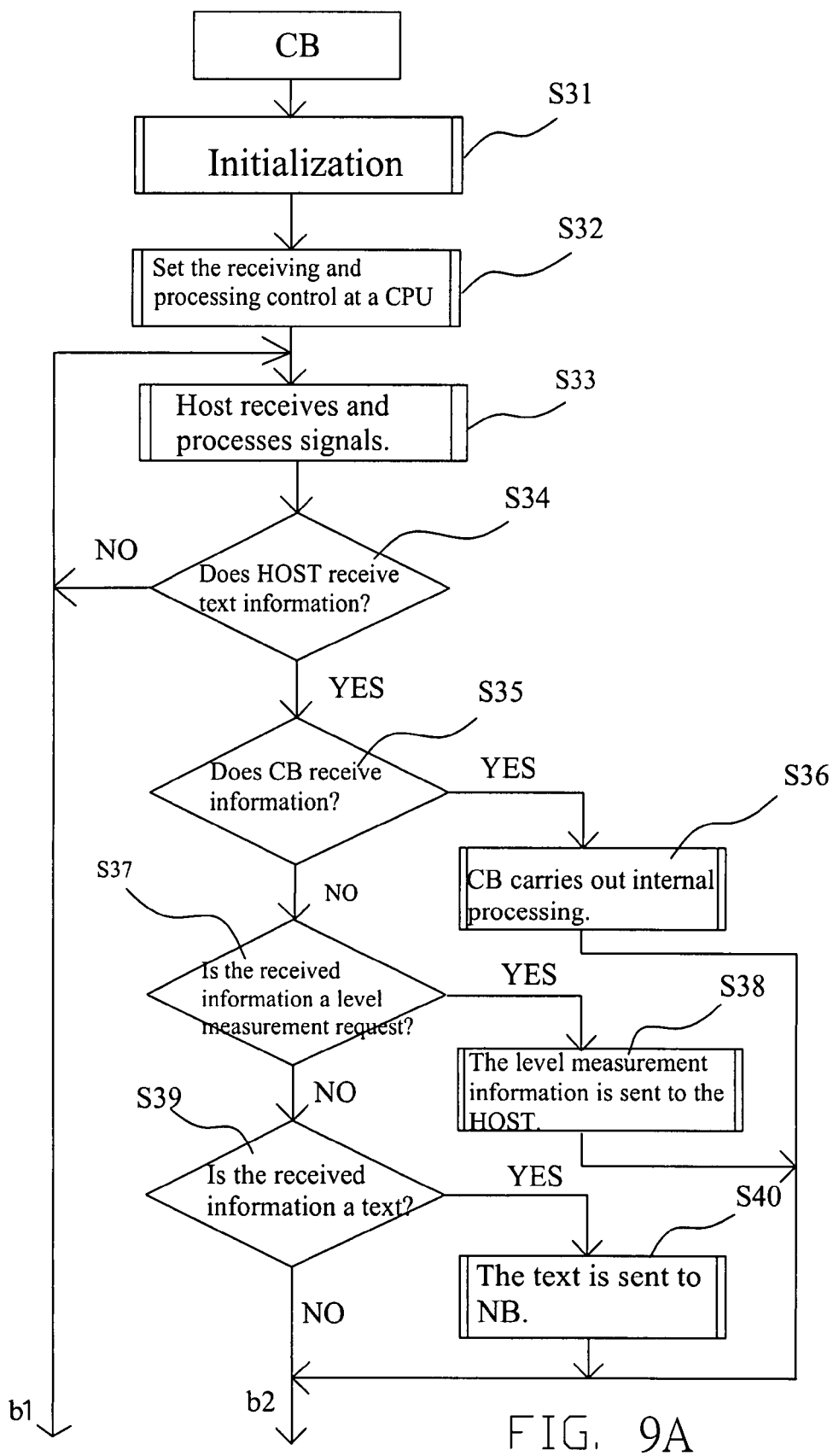
FIGS. 9A and 9B show a complete flow chart of a MPU according to the portion processed by a preinstalled program as shown in FIG. 3.
Figure 9B:
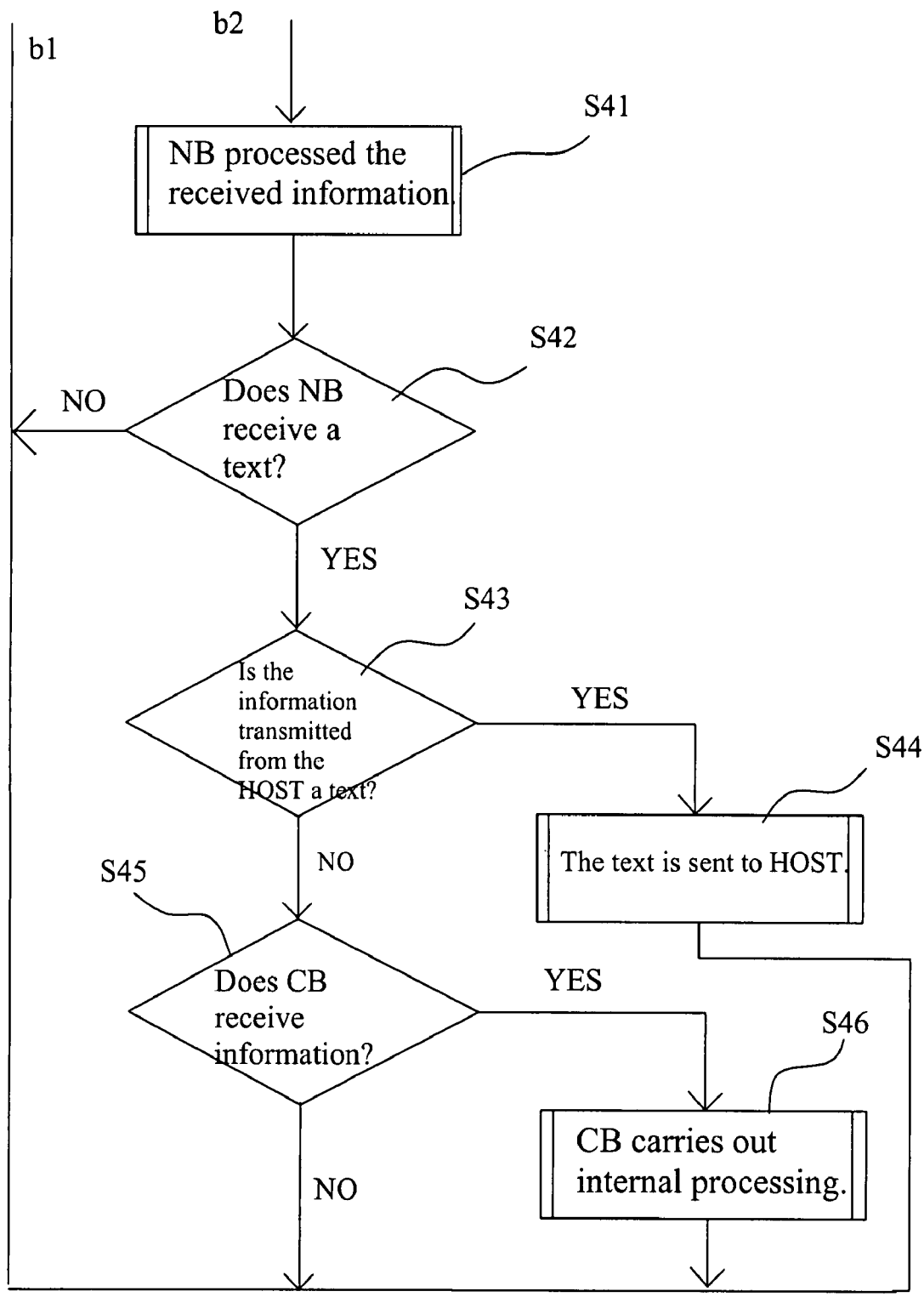

Refer to FIGS. 9A and 9B for a complete flow chart of the MPU 26 executes the operation and processing of the central controller CB according to a program.

The MPU 26 of the central controller CB starts operating and executes the initialization after it is powered on (Step S31). The dedicated computer PC-A sets the parameters required for the control for receiving and processing, and then executes the receiving and processing of the host computer HOST (Step S33). If a text is received from the HOST (YES for Step S34) and the received information is used by the central controller CB (YES for Step S35), the internal processing of the central controller CB will be executed (Step S36). If the received information is a level measurement information requested by the noise control terminal NB (YES for Step S37), the level measurement and measurement information will be sent to the HOST (Step S38). If the received information belongs to a text transmitted from the noise control terminal NB (YES for Step S39), the text will be sent to the noise control terminal NB (Step S40).

In the receiving process of the noise control terminal NB (Step S41), if a text is received from the noise control terminal NB (YES for Step S42) and the information transmitted from the HOST is text (YES for Step S43), the text will be sent to the HOST (Step S44). The received information is used by the central controller CB (YES for Step S45), the internal processing of central controller CB will be carried out (Step S46).

According to the aforementioned preferred embodiment, all automatic noise control terminals NB corresponding to the ID codes, timing data and automatic cutoff conditions of the noise level are sent to the central controller CB by the FSK communication method, and the computer of the central controller CB can store, analyze and process the data. Further, it is noteworthy to point out that the ID code information database of an automatic noise control terminal NB corresponding to an ID code and capable of specifying its installation location is stored in the computer at the control center CC.

In addition, the unused frequency band of the upstream circuit of the CATV circuit are selected and set for the bidirectional communications over the Internet and detecting an existing level of a single frequency band, and can determine whether or not the noise with such level at the upstream circuit of the Internet is a harmful noise, and thus a low-priced noise level measuring device with a correction method can be applied for the component of the automatic noise control terminal NB.

A CATV system in accordance with a preferred embodiment of the present invention is used in an upstream circuit of a CATV with a specific frequency in the Internet of a company. With the function of automatic disconnection, the insertion of an automatic attenuator, and the automatic recovery, the automatic noise controller NB copes with the control by automatically inserting a sectionless attenuation of the measured noise level.

Further, the polling method is applied for sending a maximum 48 bytes of data from the automatic noise control terminal NB to the central controller CB, and the allocation content of these 48 bytes are: 1 byte of headend code, 4 bytes of ID code, 3 bytes of automatic state (cutoff, connected or inserting attenuator), 24 bytes of data of noise level measured once for every 10 minutes for 2 hours (maximum 2 decimals× 12 times), and 1 byte of end code.

These saved data are analyzed by the dedicated computer PC of the central controller CB and displayed on the disconnected automatic noise control terminal, and the ID code of the region type of an automatically disconnected automatic noise control terminal is blinked, and an alarm is issued. Therefore, a specific failed automatic noise control terminal can be located easily from the display, so as users can provide immediate responses to user's query and complaints. From the past experience, the information of an appropriate reply to repair time and noise condition can be used as a basis for determining whether or not to take an emergency strategy.

The collected cutoff data is analyzed daily, weekly, monthly for the data processing, and the automatic noise control terminal and region with a larger number of cutoffs, and the noise automatic noise control terminal and area with a high frequency of occurrence can be used for improving the circuit and making the construction plan easy.

The data analysis of the occurring time of noises is preformed according to the noise level and the occurring time, and thus the noise strategy for each automatic noise control terminal and region can be planned to achieve the effects of lowering noises for home electrical appliances and improving the quality of circuit in the region.

For planning a construction plan, we can use the analysis result obtained from the noise level and occurring time to define the automatic noise control terminal and region where the noise occurs easily, so as to eliminate user's dissatisfaction by centralized strategies, feedbacks and implementations of the plan.

The accumulated data can be saved and used as the management data for the actual noise condition of each terminal, which can provide excellent directives for the noise strategy of a construction plan and an expansion plan, or important policies for normal CATV business operations.

In the past, electric properties of a circuit cannot be controlled simply by data detected at the site near the CATV terminal. The data transmission between the central controller and the automatic noise control terminal can be conducted for terminals by individual, group or the whole terminal to carry out data control setup and control mode setup. The automatic cutoff of each noise control terminal is carried out automatically, the automatic attenuation is inserted, and the automatic recovery can be performed freely by the control from the control center to a remote end. In addition, both automatic and manual operation for setting different thresholds can be toggled freely from the control center, so as to achieve the effect of greatly reducing the time and effort of managing the traditional CATV circuit, improving the signal quality, and providing the circuit stability brought by the automation.

Particularly, the noise level measuring portion 2 is a component of a traditional receiver which is available easily with a low price. The unique correction method which was considered a high-priced level measurement in the past can be achieved by a low price for a high performance. The automatic noise control terminal uses a single frequency to measure the noises, and such level measuring and correction method does not offer users an option of selecting a different frequency for the measurement.

The automatic noise measuring device is installed on the CATV circuit to achieve a cost-effective manufacture. In addition, the issues of finding the noise source of a CATV circuit and inserting a sectionless attenuator automatically can be achieved. Since the sectionless attenuator is inserted automatically at a noise source, therefore the noise stream can be prevented, and the upstream noise can be suppressed and minimized. Further, the measured noise data are used in the FSK communication method for the central controller and each automatic noise control terminal, such that the condition and location of the noise can be analyzed specifically through the connection of the central controller with a computer, so as to simplify customer service, provide data for improving a construction plan, and enhance the signal quality and management in a CATV circuit significantly.

What is claimed is:

1. A CATV circuit with an automatic noise controller, for automatically reducing an upstream noise occurred at a CATV circuit for bidirectional communications between a headend control center and a home terminal, characterized in that a variable attenuation method is applied serially to an upstream circuit of said CATV circuit; and a downstream location uses said variable attenuation method to measure an upstream noise level; and said CATV circuit with an automatic noise controller controls the attenuation rate of said variable attenuation method according to a level measured by said noise level measurement method which uses a conversion method for converting a specific frequency component of an unused upstream circuit frequency band in an upstream circuit into a DC level according to a level, and a computing method for outputting an output level X memorized by a memory method from a signal with three different input levels Y in said specific frequency band used for setting factors a and b in an approximation formula $Y=a\ log_e X+b$, and said conversion method sets a DC level for conversion to X, and substitutes X into said memory approximation formula according to said memory method to obtain said upstream noise level Y.

2. The CATV circuit with an automatic noise controller of claim 1, wherein if said second noise threshold of said attenuation control method is higher than said first noise threshold, and said measured noise level is lower than said first noise threshold and said noise level detected at said upstream circuit with an attenuation rate at a connected state is higher than said second noise threshold, then said attenuation rate of said upstream circuit at a cutoff state and said measured noise level at said first and second noise threshold can be controlled by said attenuation rate of said measured noise level.

3. The CATV circuit with an automatic noise controller of claim 2, and a sender's identification information is bundled when information is sent from an upstream end of said variable attenuation method and a downstream circuit of said CATV circuit to said control center, characterized in that when said attenuation control method controls the attenuation rate for a physical disconnection of said upstream circuit, said measured noise level further includes said transmission method and said control method for transmitting information to said control center.

4. The CATV circuit with an automatic noise controller of claim 3, and said measured noise level that uses a noise level memory method for memorizing information in a fixed hour internal and an upstream of said variable attenuation method further includes a receiving method of said upstream circuit for receiving information from said control center, characterized in that said transmission control method can receive polling information from said control center in a fixed time interval according to said transmission method, and said noise level information memory method is used for memorizing said noise level, and said transmission method is used for transmitting information to said control center.

5. The CATV circuit with an automatic noise controller of claim 1, wherein if said second noise threshold is higher than said first noise threshold, and said measured noise level is lower than said first noise threshold in the attenuation control method, and said measured noise level is higher than said second noise threshold in the attenuation rate of the physical connection of said upstream circuit, the attenuation rate can be controlled according to said measured noise level when said upstream circuit is physically disconnected, and said measured noise level falls within said first and second noise thresholds.

6. The CATV circuit with an automatic noise controller of claim 5, and a sender's identification information is bundled when information is sent from an upstream end of said variable attenuation method and a downstream circuit of said CATV circuit to said control center, characterized in that when said attenuation control method controls the attenuation rate for a physical disconnection of said upstream circuit, said measured noise level further includes said transmission method and said control method for transmitting information to said control center.

7. The CATV circuit with an automatic noise controller of claim 6, and said measured noise level that uses a noise level memory method for memorizing information in a fixed hour internal and an upstream of said variable attenuation method further includes a receiving method of said upstream circuit for receiving information from said control center, characterized in that said transmission control method can receive polling information from said control center in a fixed time interval according to said transmission method, and said noise level information memory method is used for memorizing said noise level, and said transmission method is used for transmitting information to said control center.

8. A control center with a broadcasting function, and said control center is connected to a home terminal through a CATV circuit in a tree structure, and a CATV system installed between said control center and said home terminal for executing bidirectional communications, comprising:

a CATV circuit automatic noise controller, for automatically lowering the upstream noise of said CATV circuit that carries out bidirectional communications between said control center with a front side and a home terminal;

an upstream circuit, for implementing a variable attenuation method serially in said CATV circuit, and a downstream end of said variable attenuation method, for implementing a measuring method for measuring the noise level of an upstream noise;

a CATV circuit automatic noise controller, capable of measuring a noise level according to said noise level measuring method to control the attenuation rate of said variable attenuation method; and said CATV circuit automatic noise controller is characterized in that if said second noise threshold is higher than said first noise threshold, and said measured noise level is lower than said first noise threshold in the attenuation control method, and said measured noise level is higher than said second noise threshold in the attenuation rate of said physically connected upstream circuit, the attenuation rate can be controlled according to said measured noise level when said upstream circuit is physically disconnected, and said measured noise level falls within said first and second noise thresholds; and when said CATV circuit automatic noise controller, and said upstream end of said variable attenuation method, said downstream circuit of said CATV circuit transmit information to said control center, the transmission method for transmitting an identified and bundled sender's identification information is characterized in that when said attenuation control method controls the attenuation rate for a physical disconnection of said upstream circuit, said measured noise level further includes said transmission method and said control method for transmitting information to said control center;

said CATV circuit automatic noise controller and said measured noise level use said noise level memory method for memorizing information in a fixed hour internal and an upstream of said variable attenuation method further includes a receiving method of said upstream circuit for receiving information from said control center, characterized in that said transmission control method can receive polling information from said control center in a fixed time interval according to said transmission method, and said noise level information memory method is used for memorizing said noise level, and said transmission method is used for transmitting information to said control center;

said automatic noise controller is connected to said CATV circuit that is connected to said home terminal in series; and a CATV system, characterized in that said control center includes an automatic noise controller connected to said CATV circuit that masks said CATV circuit to a disconnection value for controlling the attenuation rate of said attenuator, and to collect said measured noise level transmitted by said transmission method, while said automatic noise controller connected to said CATV circuit transmits polling information by a specific timing, and copes with the transmission of said polling information and receives said measured noise level from said noise controller transmitted by said transmission method and said collecting method for collecting said noise level;

said control center comprises an inter device to access internet.

9. A control center with a broadcasting function, and said control center is connected to a home terminal through a CATV circuit in a tree structure, and a CATV system installed between said control center and said home terminal for executing bidirectional communications, comprising:

a CATV circuit automatic noise controller, for automatically lowering the upstream noise of said CATV circuit that carries out bidirectional communications between said control center with a front side and a home terminal;

an upstream circuit, for implementing a variable attenuation method serially in said CATV circuit, and a downstream end of said variable attenuation method for implementing a measuring method for measuring the noise level of an upstream noise;

a CATV circuit automatic noise controller, capable of measuring a noise level according to said noise level measuring method to control the attenuation rate of said variable attenuation method;

said CATV circuit automatic noise controller is characterized in that said noise measuring method uses a portion of a specific frequency in an unused wave frequency section in said upstream circuit, and converts the potential into a DC potential according to a conversion method, and a method of using the output potential X of the three or more Y signals with different potentials inputted into said specific frequency section as an approximation of $Y=a\ log_e X+b$ where a and b are factor is used as a pre-memorizing method, and said DC potential converted by said conversion method is set to X, and substituted into the approximation memorized by said memory method, so as to constitute a calculation method for calculating said upstream noise level Y;

said CATV circuit automatic noise controller is characterized in that if said second noise threshold is higher than said first noise threshold, and said measured noise level is lower than said first noise threshold in the attenuation control method, and said measured noise level is higher than said second noise threshold in the attenuation rate of said physically connected upstream circuit, the attenuation rate can be controlled according to said measured noise level when said upstream circuit is physically disconnected, and said measured noise level falls within said first and second noise thresholds; and when said CATV circuit automatic noise controller, and said upstream end of said variable attenuation method, said downstream circuit of said CATV circuit transmit information to said control center, the transmission method for transmitting an identified and bundled sender's identification information is characterized in that when said attenuation control method controls the attenuation rate for a physical disconnection of said upstream circuit, said measured noise level further includes said transmission method and said control method for transmitting information to said control center;

said CATV circuit automatic noise controller and said measured noise level use said noise level memory method for memorizing information in a fixed hour internal and an upstream of said variable attenuation method further includes a receiving method of said upstream circuit for receiving information from said control center, characterized in that said transmission control method can receive polling information from said control center in a fixed time interval according to said transmission method, and said noise level information memory method is used for memorizing said noise level, and said transmission method is used for transmitting information to said control center;

said automatic noise controller is connected to said CATV circuit that is connected to said home terminal in series; and a CATV system, characterized in that said control center includes an automatic noise controller connected to said CATV circuit that masks said CATV circuit to a disconnection value for controlling the attenuation rate of said attenuator, and to collect said measured noise level transmitted by said transmission method, while said automatic noise controller connected to said CATV circuit transmits polling information by a specific timing, and copes with the transmission of said polling information and receives said measured noise level from said noise controller transmitted by said transmission method and said collecting method for collecting said noise level;

said control center comprises an inter device to access internet.

\* \* \* \* \*